(12) United States Patent
Burgess et al.

(10) Patent No.: US 11,376,733 B2
(45) Date of Patent: Jul. 5, 2022

(54) MECHANICAL EYEBALL FOR ANIMATRONIC DEVICES

(71) Applicant: Facebook Technologies, LLC, Menlo Park, CA (US)

(72) Inventors: Kirk Erik Burgess, Newark, CA (US); Antonio Yamil Layon Halun, Los Altos, CA (US); Sebastian Sztuk, Menlo Park, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 577 days.

(21) Appl. No.: 16/437,579

(22) Filed: Jun. 11, 2019

(65) Prior Publication Data

US 2020/0391383 A1    Dec. 17, 2020

(51) Int. Cl.
| | |
|---|---|
| *B25J 9/16* | (2006.01) |
| *G06N 20/00* | (2019.01) |
| *B25J 13/08* | (2006.01) |
| *G06F 3/01* | (2006.01) |

(52) U.S. Cl.
CPC ............. *B25J 9/1664* (2013.01); *B25J 9/163* (2013.01); *B25J 13/08* (2013.01); *G06N 20/00* (2019.01); *G06F 3/013* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 2 A | * | 7/1836 | Gouldino | D01G 21/00 57/58.49 |
| 4,005,545 A | * | 2/1977 | Ptaszek | A63H 3/40 446/341 |
| 8,285,416 B2 | * | 10/2012 | Cho | H04N 5/23248 382/153 |
| 8,998,672 B2 | * | 4/2015 | Lin | A63H 3/20 446/337 |
| 9,079,113 B2 | * | 7/2015 | Wong | A63H 3/28 |
| 9,092,021 B2 | * | 7/2015 | Wong | G06F 3/0362 |
| 9,358,475 B2 | * | 6/2016 | Michalowski | A63H 15/06 |
| 10,836,041 B2 | * | 11/2020 | Ichikawa | B25J 9/1697 |

(Continued)

FOREIGN PATENT DOCUMENTS

WO    WO 2017/082979 A1    5/2017

OTHER PUBLICATIONS

United States Office Action, U.S. Appl. No. 16/437,570, dated May 21, 2021, nine pages.

(Continued)

*Primary Examiner* — Jonathan L Sample
(74) *Attorney, Agent, or Firm* — Fenwick & West LLP

(57) ABSTRACT

An animatronic device includes a mechanical eyeball configured to rotate about a first rotational axis and a second rotational axis that intersect at a fixed center point. A controller is configured to generate eye movement instructions that cause the animatronic device to rotate the mechanical eyeball about at least one of the first rotational axis and the second rotational axis. The eye movement instructions are generated based on an eye tracking system used to track movement of an eye of a user. The controller maps the tracked eye movement to movement of the mechanical eyeball and generates eye movement instructions based on the mapping.

17 Claims, 11 Drawing Sheets

(56) References Cited

U.S. PATENT DOCUMENTS

| | | | |
|---|---|---|---|
| 2002/0111112 A1* | 8/2002 | Willett | A63H 3/40 446/330 |
| 2004/0249510 A1* | 12/2004 | Hanson | G06N 3/008 700/245 |
| 2006/0093998 A1* | 5/2006 | Vertegaal | H04N 7/18 705/7.29 |
| 2006/0239670 A1* | 10/2006 | Cleveland | A61B 3/113 396/51 |
| 2006/0293787 A1* | 12/2006 | Kanda | G06N 3/008 700/253 |
| 2008/0191827 A1* | 8/2008 | Hsiao | A63H 3/40 335/229 |
| 2008/0229859 A1 | 9/2008 | Hsiao et al. | |
| 2009/0055019 A1* | 2/2009 | Stiehl | B25J 9/1671 901/17 |
| 2010/0023163 A1* | 1/2010 | Kidd | G05B 15/00 700/245 |
| 2011/0066239 A1* | 3/2011 | Smoot | G09B 23/30 623/6.64 |
| 2011/0097968 A1* | 4/2011 | Li | A63H 3/40 446/343 |
| 2015/0165336 A1* | 6/2015 | Michalowski | A63H 29/22 446/330 |
| 2016/0331514 A1* | 11/2016 | Christopherson | A61F 2/141 |
| 2016/0354702 A1* | 12/2016 | Smoot | A61F 2/141 |
| 2018/0144663 A1* | 5/2018 | Kirchoff | G09B 23/32 |
| 2018/0160035 A1* | 6/2018 | Cleveland | H04N 5/2256 |
| 2018/0370032 A1* | 12/2018 | Ichikawa | B25J 9/1697 |
| 2018/0370039 A1* | 12/2018 | Nakagome | G06V 40/174 |
| 2019/0015758 A1* | 1/2019 | Higuchi | A63H 33/005 |
| 2020/0019237 A1* | 1/2020 | Jackson | G06F 3/013 |
| 2020/0167968 A1* | 5/2020 | Trim | G06F 1/163 |
| 2020/0214626 A1* | 7/2020 | Boyle | A61B 5/742 |
| 2020/0269149 A1* | 8/2020 | Chung | A63H 13/005 |
| 2020/0391382 A1* | 12/2020 | Burgess | B25J 17/0258 |

OTHER PUBLICATIONS

PCT International Search Report and Written Opinion, PCT Application No. PCT/US2020/034757, dated Aug. 25, 2020, 11 pages.

* cited by examiner

700

Provide a set of instructions including a test movement pattern
710

Receive tracked eye movement of a mechanical eyeball executing the test movement pattern from an eye tracking system under test
720

Determine values for one or more metrics describing performance of the eye tracking system under test based in part on the tracked eye movement
730

FIG. 7

MECHANICAL EYEBALL FOR ANIMATRONIC DEVICES

BACKGROUND

The present disclosure generally relates to animatronic devices, and specifically to animatronic devices including mechanical eyeballs configured to rotate about two axes.

Eye tracking systems are designed to measure positions and movement of one or both eyes of a subject. As a human eye is capable of moving in several directions, with movements that range from subtle to large and slow to fast, validating an eye tracking system to ensure that it accurately tracks and measures eye movements is important. Eye tracking systems are typically evaluated by performing a simulation with human subjects, in which the subjects are asked to focus their eyes on a specified target on a screen while a measurement is taken. However, it can be difficult to confirm whether the subject is focusing on the correct target on the screen, which can introduce variability in the calibration process. As such, validating how well an eye tracking system is performing can be challenging unless it's possible to control exactly where the subject's eyes are looking.

While some mechanical eyeballs have been previously developed to mechanically control the direction in which a mechanical eyeball points, the designs typically use a series of push rods (e.g., a server motor coupled to a linkage arm) to push on portions of the mechanical eyeball to cause it to rotate in one or more directions. As an example, a first push rod may couple to a portion of the mechanical eyeball to cause it to rotate in a first direction, and a second push rod may couple to a different portion of the mechanical eyeball to cause it to rotate in a second direction. Push rod systems generally consume a significant amount of space, which is impractical for use in an animatronic system or a realistic mechanical eyeball. Additionally, to orient a mechanical eyeball such that an optical axis of the mechanical eyeball points in a desired direction, push rod systems would require a lookup table that defines an arm angle of each push rod for every possible direction in space. Furthermore, as an arm is pushed forward or pulled backward, the arm angle changes, causing the distance traveled by an end of the arm (coupled to the mechanical eyeball) to vary with position. In this configuration, every position is dependent on the previous position and arm angle of each push rod as it affects the distance to be traveled to achieve the subsequent position. Finally, movement of one arm affects the movement of the other arm, causing the effect to be compounded and likely introducing significant error.

SUMMARY

Embodiments relate to an animatronic device including one or more mechanical eyeballs designed to resemble those of a human. Each mechanical eyeball is configured to rotate about a first rotational axis and a second rotational axis that intersect at a fixed center point of the mechanical eyeball. A controller generates eye movement instructions that cause the animatronic device to rotate the mechanical eyeball about the first rotational axis, the second rotational axis, or some combination thereof. In one embodiment, the controller generates the eye movement instructions based on an eye tracking system that tracks eye movement of a right eye and/or a left eye of a user. The animatronic device actuates a portion of the mechanical eyeball based on the eye movement instructions provided by the controller. The eye movement instructions may cause the mechanical eyeball(s) to rotate in a way that mirrors the eye movement of the user.

BRIEF DESCRIPTION OF THE DRAWINGS

FIG. 7 is a flowchart illustrating a method of calibrating an animatronic device, in accordance with one or more embodiments.

Figure 1A:
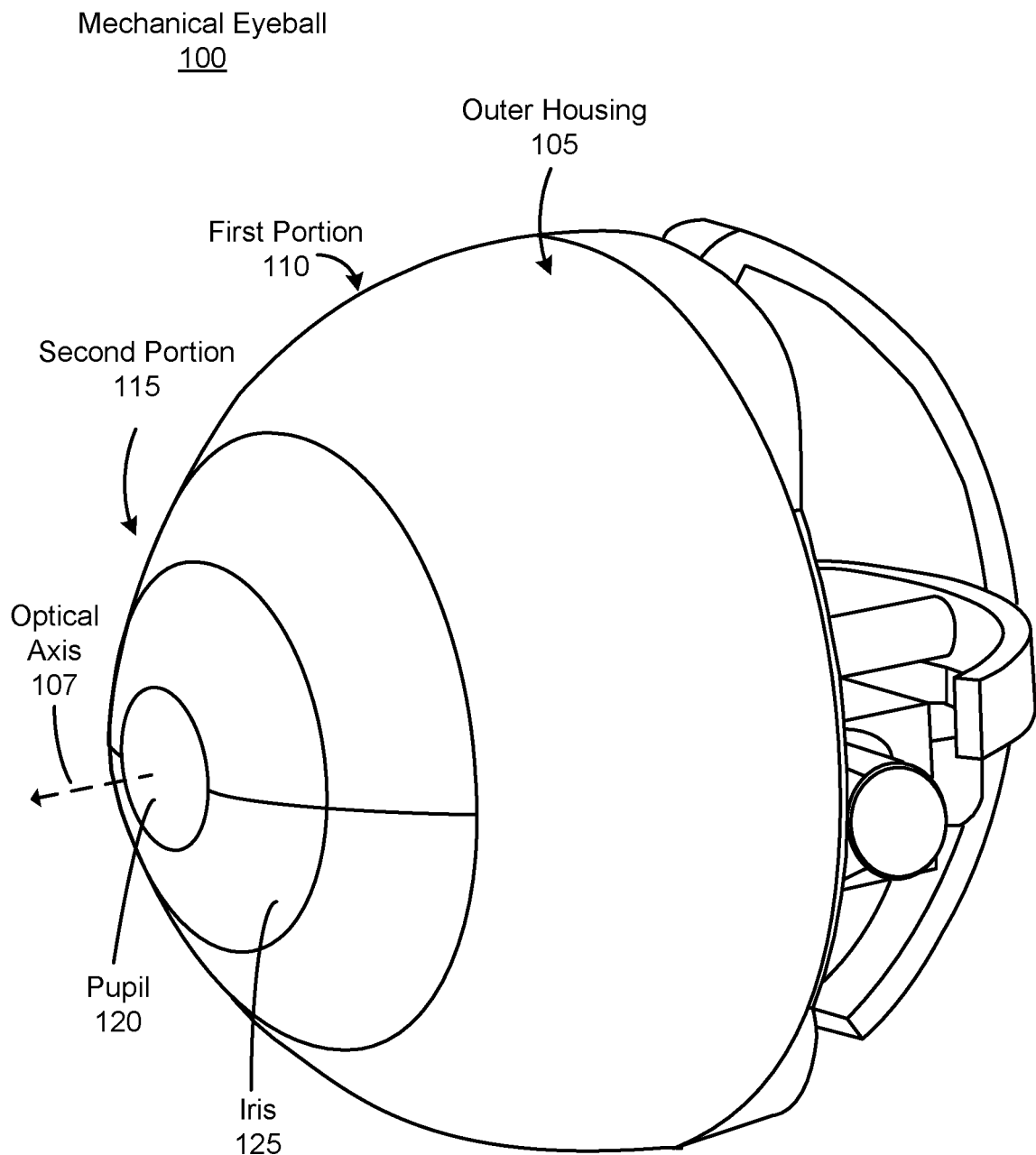
FIG. 1A is an isometric view of an example mechanical eyeball, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A mechanical eyeball is designed to rotate about a first rotational axis and a second rotational axis that intersect at a fixed center point of the mechanical eyeball. In an example embodiment, the first rotational axis and the second rotational axis are orthogonal to each other through the center point. In addition, rotation about the first rotational axis and rotation about the second rotational axis are decoupled (i.e., rotation of the mechanical eyeball about the first rotational axis does not affect rotation of the mechanical eyeball about the second rotational axis and vice versa). This configuration allows for one or more fixed sensory points for measuring an amount of rotation about each of the two axes. This design differs from traditional two-axis gimbal designs, in which a first axis is fixed while a second axis travels with the device coupled to the gimbal. To measure an amount of rotation about the second axis that moves, a sensor (e.g., an encoder) travels with the axis, which requires a clearance path that needs to be kept clear for the sensor. In addition, for a mechanical eyeball with a traditional two-dimensional gimbal, the sensor is coupled to one or more cables that also need to travel with the sensor and negotiate movements around other components of the mechanical eyeball.

In one embodiment, the mechanical eyeball comprises an outer housing shaped as an ocular surface. The outer housing may have a mostly spherical surface representing a sclera of an eye and a curved surface representing a cornea of an eye. The cornea can include a pupil, where the pupil may be an aperture in the cornea and/or may be coupled to a sensor, a light, or another component to assist in eye tracking validation. The outer housing rotates about a center point about a horizontal axis (e.g., first rotational axis) and about a vertical axis (e.g., second rotational axis) that intersect at the center point. The outer housing is coupled to a mechanical assembly, configured to cause rotation of the outer housing. The mechanical assembly is contained at least partially within a volume associated with the mechanical eyeball. The volume associated with the mechanical eyeball may be an approximately spherical volume defined by the mostly spherical surface of the outer housing. The mechanical assembly comprises a gear carriage, a yoke, a first gear train, a knuckle component, and a differential gear train.

The gear carriage is mounted to a fixed support structure for the mechanical eyeball and houses the differential gear train. The differential gear train is designed to cause rotation of the knuckle component about the vertical axis and the yoke about the horizontal axis. A portion of the differential gear train is coupled to a first driver. The first driver actuates a first portion of the differential gear train, which causes rotation of the first gear train. The first gear train is coupled to the knuckle component and the knuckle component is coupled to the outer housing such that actuation of the first gear train causes rotation of the outer housing about the vertical axis. Additionally, a second driver actuates a second portion of the differential gear train, which is coupled to the yoke to rotate the yoke about the horizontal axis. As the yoke is coupled to the outer housing, rotation of the yoke causes simultaneous rotation of the outer housing about the horizontal axis. The first driver and the second driver are at least partially external to the mechanical eyeball. A portion of the first driver and the second driver external to the mechanical eyeball can be coupled to one or more motors configured to actuate rotation of the drivers.

The mechanical assembly may further comprise a horizontal encoder bar and a vertical encoder bar. In one embodiment, the horizontal encoder bar and the vertical encoder bar are each arc-shaped and include an encoding strip along the length of the arc. The mechanical eyeball can be positioned proximal to one or more sensors (e.g., encoders) for reading the horizontal encoder bar and/or the vertical encoder bar. The horizontal encoder bar is rotatably coupled to the gear carriage such that it rotates about the center point about the vertical axis. The horizontal encoder bar is coupled to the outer housing via a slot such that rotation of the outer housing about the vertical axis causes simultaneous rotation of the horizontal encoder bar while rotation of the yoke about the horizontal axis does not affect the horizontal encoder bar. In particular, the orientation of the slot enables the horizontal encoder bar to move independent of the yoke. The vertical encoder bar is coupled to the yoke such that rotation of the yoke about the horizontal axis causes simultaneous rotation of the vertical encoder bar. In this configuration, the horizontal encoder bar rotates only about the vertical axis, and the vertical encoder bar rotates only about the horizontal axis.

In one embodiment, an animatronic device includes one or more mechanical eyeballs (e.g., as described above). A controller generates eye movement instructions that cause the animatronic device to rotate the mechanical eyeball about the horizontal axis, the vertical axis, or some combination thereof. The eye movement instructions may include encoder values that correspond to a position of the horizontal encoder bar and/or the vertical encoder bar. The eye movement instructions can be generated based on an eye tracking system. The eye tracking system is configured to track and measure the movement of one or more eyes of a user. Based on the tracked eye movement, the controller may generate eye movement instructions that cause the mechanical eyeball to rotate in a way that mirrors the eye movement of the subject. Responsive to the generated eye movement instructions, the animatronic device actuates the first driver and/or the second driver to cause rotation of the mechanical eyeball. In some embodiments, the animatronic device includes two mechanical eyeballs that each rotate in accordance with the eye movement instructions generated by the controller based on tracking of a left eye and a right eye of a user. Additionally, the controller can compare encoder values measured by one or more sensors with predicted encoder values to verify and/or improve accuracy of the rotation of the mechanical eyeball.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Mechanical Eyeball Configuration

FIG. 1A is an example mechanical eyeball 100, in accordance with one or more embodiments. The mechanical eyeball 100 is a robotic eye designed to resemble an eye. In some embodiments, it is designed to resemble a human eye. The mechanical eyeball 100 may be part of a greater system, for example, a calibration and/or validation system for eye tracking systems, an animatronic system, other suitable applications, or some combination thereof. Example use cases of the calibration and/or validation system include dynamic uniformity correction, dynamic distortion correction, foveate rendering, or some combination thereof. The mechanical eyeball 100 is designed to rotate about a fixed center point of the mechanical eyeball 100 about two rotational axes that intersect at the center point. In this configuration, the mechanical eyeball 100 can be rotated such that an optical axis 107 of the mechanical eyeball 100 is pointed in a desired direction. The optical axis 107 defines a line of sight of the mechanical eyeball 100.

In the embodiment of FIG. 1A, the mechanical eyeball 100 includes an outer housing 105 configured to encase a portion of the mechanical eyeball 100. In FIG. 1A, the outer housing 105 is illustrated as covering a front half of the mechanical eyeball 100, but in other embodiments, the outer housing 105 may encompass a majority or all of the mechanical eyeball 100. In alternate embodiments, a second housing portion may mate with the outer housing 105 to cover all or a portion of a back half of the mechanical eyeball 100. As illustrated in FIG. 1, the outer housing 105 resembles an ocular surface and includes a first portion 110 and a second portion 115. The first portion 110 represents a sclera of an eye. The first portion 110 may have a spherical surface with a consistent curvature. The first portion 110 can be opaque and colored (e.g., white) to resemble an eye (e.g., human). The second portion 115 represents a cornea of an eye. The second portion 115 may have a curved surface with a mathematically-derived curvature to resemble a cornea.

The second portion 115 includes a pupil 120 and an iris 125. In some embodiments, the outer housing 105 may only include a pupil and/or an iris 125. In the orientation shown in FIG. 1A, the pupil 120 is positioned at an approximate center of the second portion 115. In one embodiment, the optical axis 107 of the mechanical eyeball 100 passes through the center of the pupil 120 and is approximately perpendicular to a surface of the pupil 120 at its center. Alternatively, the optical axis 107 may be slightly offset from the center of the pupil 120 to simulate a foveal axis of an eye. In some embodiments, the pupil 120 may be an aperture in the surface of the second portion 115. Additionally, the pupil 120 can be coupled to an optional device (e.g., an image sensor, an optical sensor, a light, etc.) or some other component for capturing information about rotation of the outer housing 105 about one or more rotational axes, described in greater detail below. In one example, the pupil 120 is an aperture in the outer housing 105 and is coupled to an image sensor inside the outer housing 105 that is configured to capture images and/or video as the outer housing 105 rotates about one or more axes. In some embodiments, the pupil 120 is a transparent lens, an optical component colored to resemble a human eye, or some other component configured to represent a pupil. Additionally, pupil 120 is surrounded by the iris 125, and the iris 125 may be colored (e.g., blue, green, brown) to further resemble an eye.

The mechanical eyeball 100 shown in FIG. 1A is designed to mimic an eye. In one embodiment, the mechanical eyeball 100 is configured to mate with a receptacle in an animatronic device (e.g., an animatronic head) such that the mechanical eyeball 100 represents an eye of a human (or some other animal, etc.). The volume associated with the mechanical eyeball 100 can fit as least partially within the receptacle. The volume can be defined by the surface of the outer housing 105, where the volume is approximately spherical. In some embodiments, as the mechanical eyeball 100 rotates within the receptacle at least a portion of the outer housing 105 (e.g., portions emulating the pupil, iris, and some of the sclera) is visible to an observer (so long as it is not occluded by, e.g., a mechanical eyelid). In a similar manner, portions of the mechanical eyeball 100 that are not within the outer housing 105 would not visible to the observer when the mechanical eyeball 100 is mated with the receptacle, thereby allowing the animatronic device to mimic a human eye.

Figure 1B:
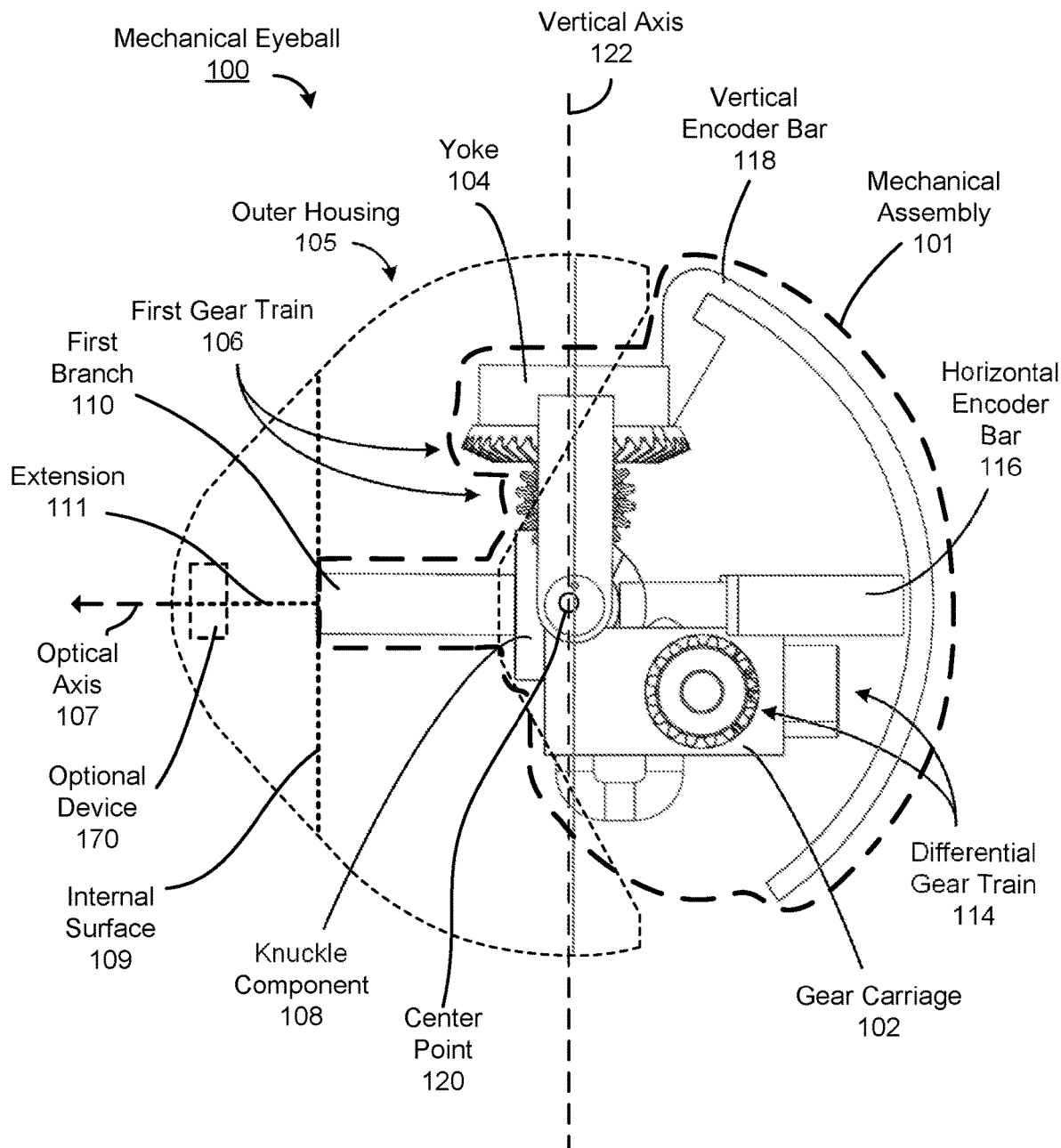
FIG. 1B is a first side view of the mechanical eyeball of FIG. 1A, in accordance with one or more embodiments.

FIG. 1B is a side view of the mechanical eyeball 100, in accordance with one or more embodiments. As shown in the embodiment of FIG. 1B, the mechanical eyeball 100 includes the outer housing 105 coupled to a mechanical assembly 101. The mechanical assembly 101 includes a gear carriage 102, a yoke 104, a first gear train 106, a knuckle component 108, a differential gear train 114, a horizontal encoder bar 116, and a vertical encoder bar 118. The mechanical eyeball 100 includes additional components shown in FIGS. 2A-2D and is described in greater detail below. The mechanical eyeball 100 can also include fewer or greater components than described herein. The mechanical assembly 101 is positioned at least partially within the outer housing 105 to allow the outer housing 105 to precisely rotate about one or more axes without interfering with components of the mechanical assembly 101. Additionally, the mechanical assembly 101 is contained within a volume associated with the mechanical eyeball 100 so that the mechanical eyeball 100 is compact and discrete. In one embodiment, the volume of the mechanical eyeball 100 is substantially the same as a human eye or another eye that the mechanical eyeball 100 is designed to resemble. As such, the design also allows the mechanical eyeball 100 to be scalable in size.

The components of the mechanical assembly 101 allow the outer housing 105 to rotate about a vertical axis 122 and a horizontal axis (not shown) that intersect at a fixed center point 120. The horizontal axis is perpendicular to the vertical axis 122 at the center point 120. The gear carriage 102 is a fixed support structure for the mechanical eyeball 100. In the embodiment of FIG. 1B, the gear carriage 102 is a stationary component that houses the differential gear train 114. The gear carriage 102 is primarily hollow and includes several bores for retaining one or more gears of the differential gear train 114 in position. The gear carriage 102 is configured so that other components of the mechanical eyeball 100 can rotate about the center point 120 without interfering with the gear carriage 102. As shown in FIG. 1B, a portion of the differential gear train 114 protrudes from the gear carriage 102. In other embodiments, the differential gear train 114 is recessed within the gear carriage 102 in order to prevent the differential gear train 114 from interfering with other components. The gear carriage 102 is composed of a material with a strength suitable for supporting rotation of other components of the mechanical eyeball 100. For example, the gear carriage 102 may be composed of stiff composite or metal.

The yoke 104 is rotatably coupled to a portion of the gear carriage 102 such that the yoke 104 can rotate about the horizontal axis (not shown) relative to the gear carriage 102. The yoke 104 rotates about the center point 120 about the horizontal axis via two joints, described in greater detail below in relation to FIG. 2C. The yoke 104 supports the structure and rotation of the first gear train 106, and the yoke 104 is coupled to the differential gear train 114 by the first gear train 106. The first gear train 106 also couples the yoke 104 to the outer housing 105 via the knuckle component 108, described below in relation to FIG. 2B. The yoke 104 may be composed of a similar material to the gear carriage 102 in order to support rotation of the outer housing 105 relative to the yoke 104.

In the embodiment of FIG. 1B, the knuckle component 108 is positioned at the center point 120 of the mechanical eyeball. The knuckle component 108 is coupled to an internal surface 109 of the outer housing 105 by a first branch 110. The internal surface 109 may be a planar surface, a bar, a beam, or some other component for coupling the outer housing 105 and the first branch 110. Additionally, the internal surface 109 may provide structural support to the mechanical eyeball 100. The first branch 110 can also include an extension 111, shown by the dashed line in FIG. 1B, passing through the internal surface 109. The extension 111 may be a thin rod protruding from the first branch 110 or an attachment removably coupled to the internal surface 109. The extension 111 may be configured to support and/or couple to additional components (e.g., optional device 170 described below).

Figure 3:
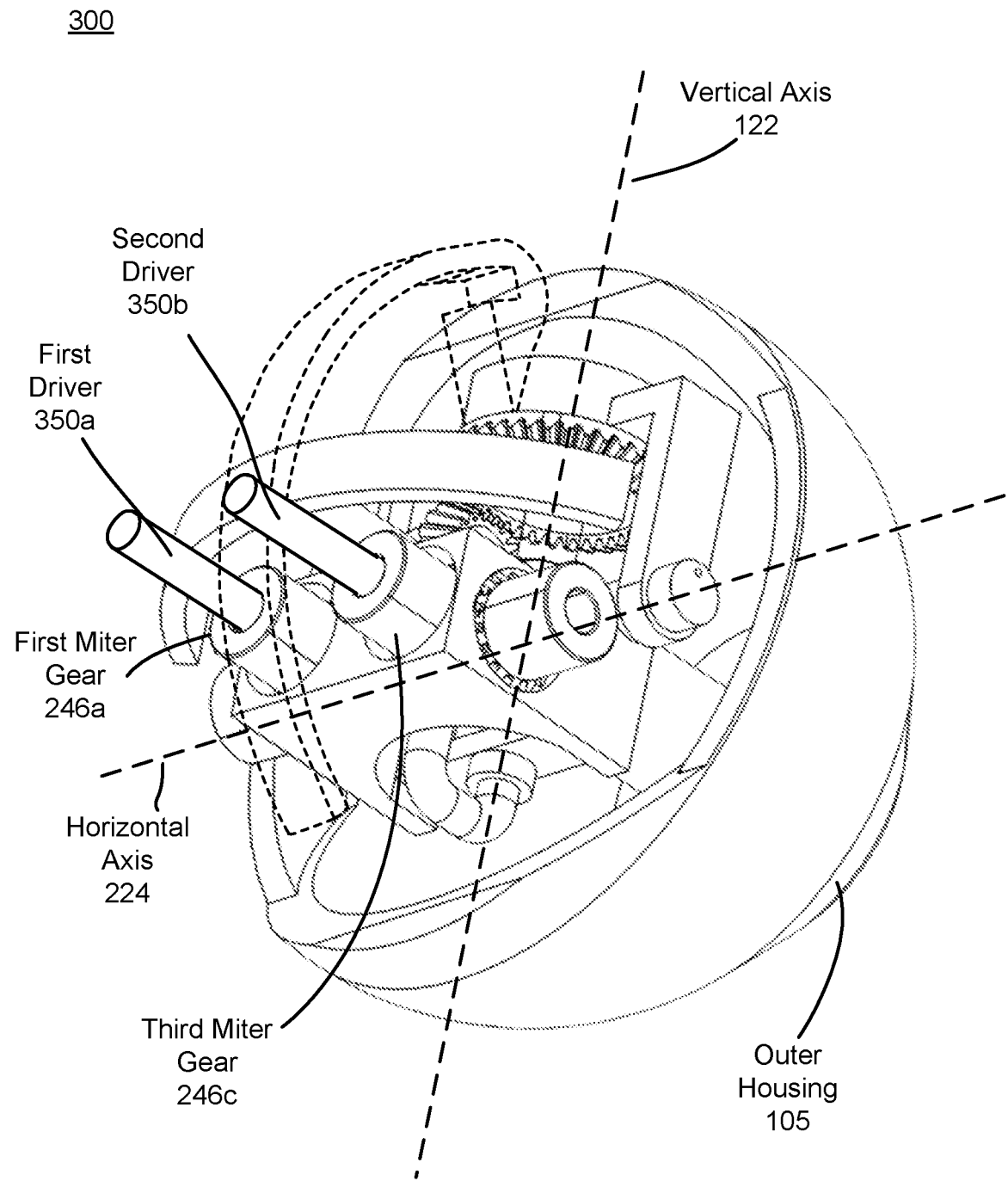
FIG. 3 is a perspective view of the mechanical eyeball of FIG. 1A coupled to a set of drivers, in accordance with one or more embodiments.

In the embodiment shown in FIG. 1B, the first branch 110 is approximately collinear with the optical axis 107 of the mechanical eyeball 100. Rotation of the first gear train 106 causes rotation of the knuckle component 108, and thus rotation of the first branch 110 about the vertical axis 122, causing the optical axis 107 to point in a desired direction. The first branch 110 may be permanently coupled to the outer housing 105 (e.g., welded) or may be removably coupled so that the components may be easily repaired or replaced. Additionally, the first branch 110 may route one or more wires (e.g., an optical wire, an electronic wire) for establishing communication between an optional device 170 and an operating system. The optional device 170 is mechanically coupled to the first branch 110 such that it is aligned with the optical axis 107. The optional device 170 may be one or more optical cameras, one or more motion sensors, one or more light sources, some other component for assisting in eye tracking validation, or some combination thereof. In the embodiment of FIG. 3, the optional device 170 is recessed within the outer housing 105. In alternative embodiments, a portion of the optional device 170 is flush with a surface of the outer housing 105 or the optional device 170 is at least partially protruding from the outer housing 105. Additionally, the optional device 170 is removable from the mechanical eyeball 100.

In the embodiment shown, the horizontal encoder bar 116 and the vertical encoder bar 118 ("encoder bars 116 and 118") are included in the mechanical assembly 101. In other embodiments, the horizontal encoder bar 116 and the vertical encoder bar 118 are not included in the mechanical assembly 101. The horizontal encoder bar 116 and the vertical encoder bar 118 are configured to rotate about the vertical axis 122 and the horizontal axis, respectively, without interfering with other components of the mechanical assembly 101. In the embodiment of FIG. 1B, the horizontal encoder bar 116 and the vertical encoder bar 118 can be encased by the outer housing 105. In other embodiments, the horizontal encoder bar 116 and vertical encoder bar 118 are external to and/or protruding from the outer housing 105.

Figure 2A:
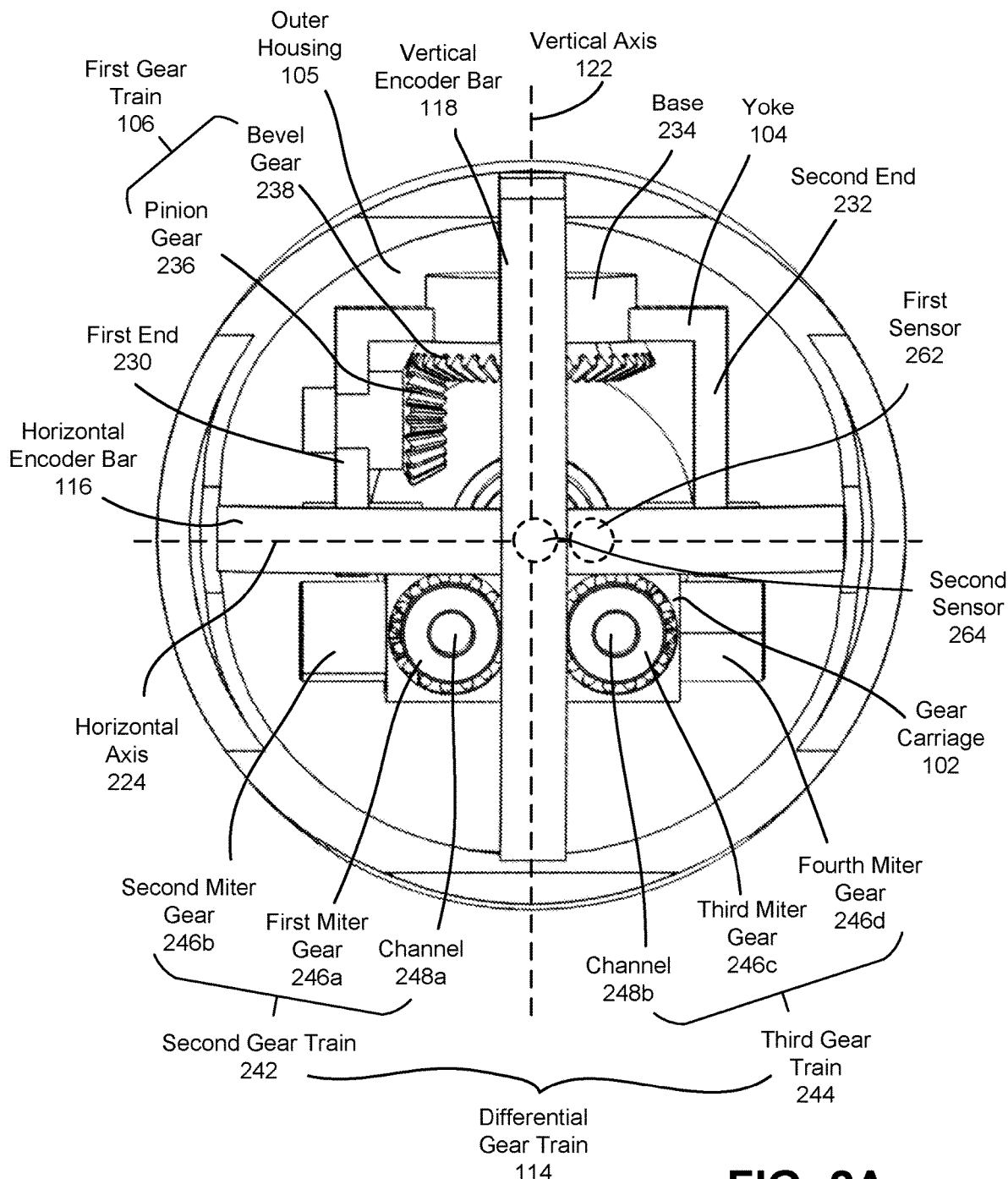
FIG. 2A is a back view of the mechanical eyeball of FIG. 1A, in accordance with one or more embodiments.
Figure 2B:
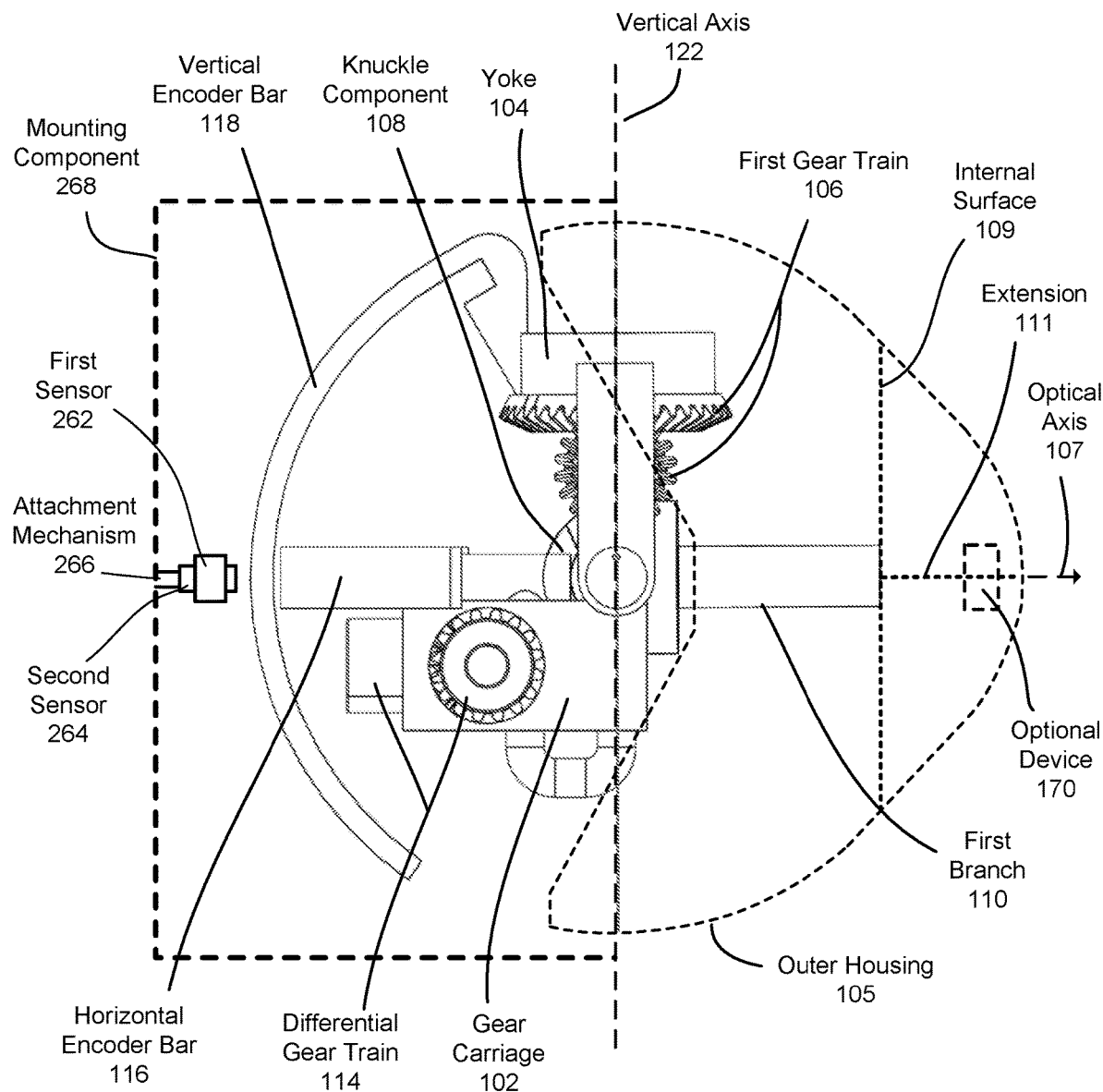
FIG. 2B is a second side view of the mechanical eyeball of FIG. 1A, in accordance with one or more embodiments.
Figure 2C:
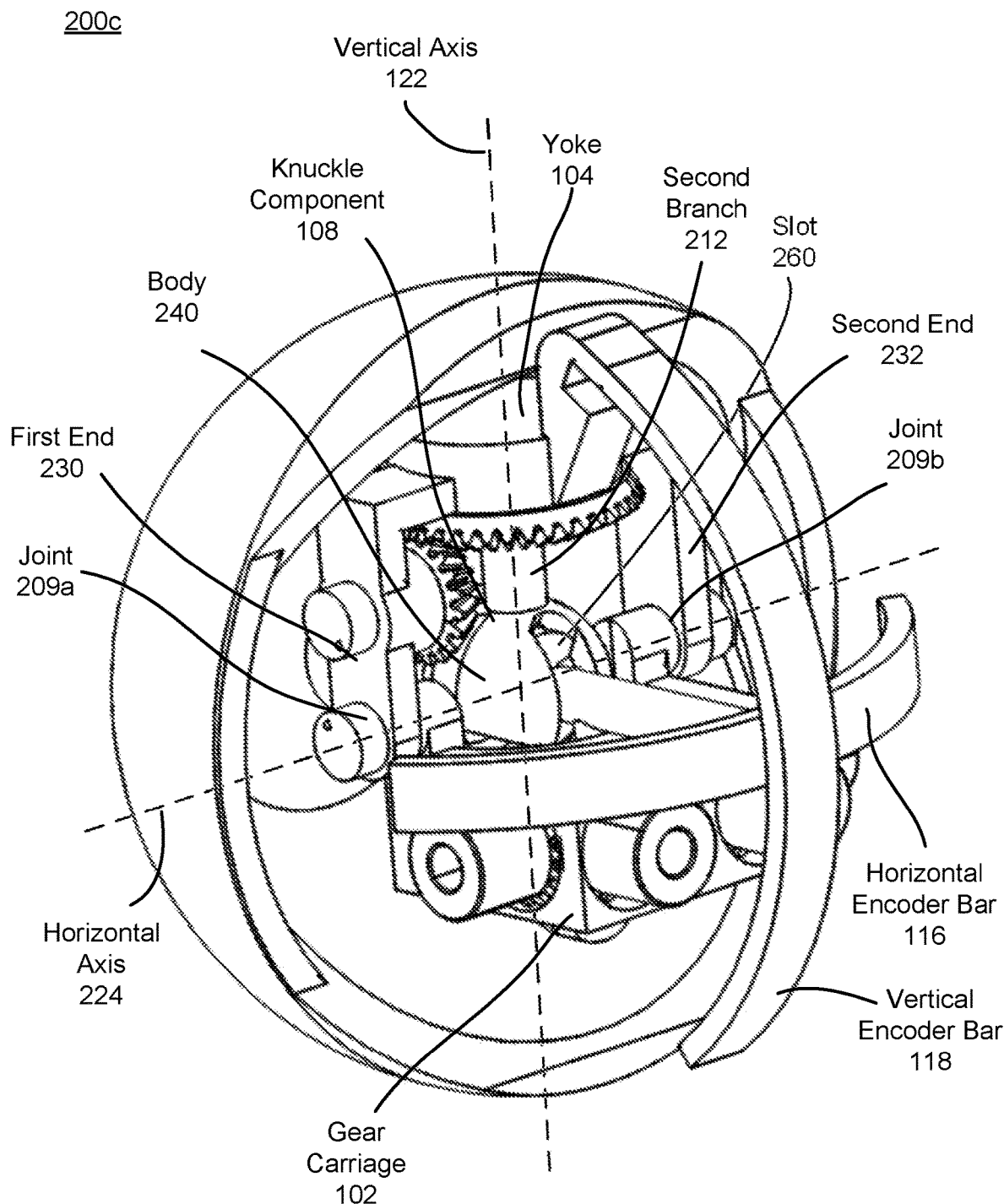
FIG. 2C is a first perspective view of the mechanical eyeball of FIG. 1A, in accordance with one or more embodiments.
Figure 2D:
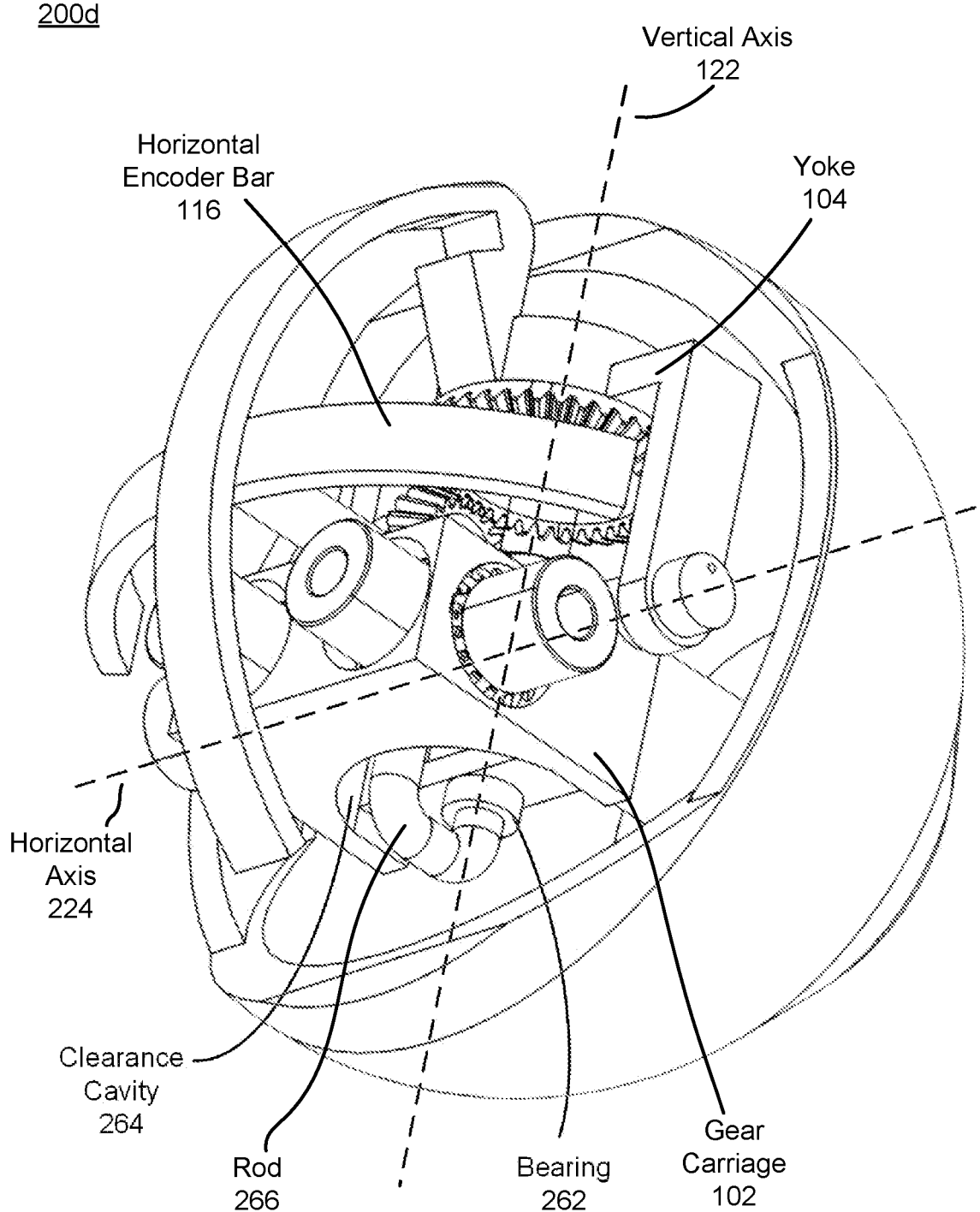
FIG. 2D is a second perspective view of the mechanical eyeball of FIG. 1A, in accordance with one or more embodiments.

The horizontal encoder bar 116 is rotatably coupled to a portion of the gear carriage 102 via a bearing (shown in FIG. 2D). Rotation of the horizontal encoder bar 116 is coupled with rotation of the outer housing 105 about the vertical axis 122. Similarly, the vertical encoder bar 118 is coupled to the yoke 104 such that the vertical encoder bar 118 can rotate about the horizontal axis. In one embodiment, the range of motion of the encoder bars 116 and 118 is constrained by the outer housing 105. Rotation of the encoder bars 116 and 118 may be constrained such that they do not interfere with a surface of the outer housing 105, or components coupled to the outer housing (e.g., internal surface 109, first branch 110, optional device 170). In the embodiment of FIG. 1B, the vertical encoder bar 118 is attached to a superior region of the yoke 104. The horizontal encoder bar 116 and the vertical encoder bar 118 may be detachable from the mechanical assembly 101. This may facilitate ease of repair or replacement. Alternatively, the encoder bars 116 and 118 can be manufactured as integral to the mechanical assembly 101. The horizontal encoder bar 116 and the vertical encoder bar 118 are arc-shaped. In one embodiment, the curve of each bar is approximately concentric with the curvature of the outer housing 105. In other embodiments, the encoder bars 116 and 118 can have a different shape suited to the mechanical eyeball 100.

The horizontal encoder bar 116 and the vertical encoder bar 118 each include at least one encoding strip on one or more of its surfaces. The encoding strips can be any type of encoding strip (e.g., magnetic strips, optical strips, electronic strips) that can be read by one or more sensors. The sensors can be any type of sensor corresponding to the encoding strip (e.g., magnetic sensors, optical sensors, electronic sensors, encoders, etc.). In some embodiments, a first sensor is configured to read the horizontal encoder bar 116 and a second sensor is configured to read the vertical encoder bar 118. The sensors can be different types of sensors or the same type of sensor. The one or more sensors may be positioned external to the mechanical eyeball 100 described below in relation to FIG. 2A-2B, or the one or more sensors may be positioned within the mechanical eyeball 100. The one or more sensors can determine a position of the horizontal encoder bar 116 and the vertical encoder bar 118, and provide the position to a controller, described in greater detail below in relation to FIG. 4. In one embodiment, the one or more sensors provide a measurement over a wireless network. In other embodiments, the encoder bars 116 and 118 can include one or more wires for transmitting a signal to another portion of the mechanical eyeball 100 or the controller.

FIGS. 2A-2D illustrate various views of the mechanical eyeball 100 of FIG. 1A, in accordance with one or more embodiments. FIG. 2A is a back view 200a of the mechanical eyeball 100, in accordance with one or more embodiments. Illustrated in FIG. 2A, the yoke 104 is a U-shaped component having a first end 230, a second end 232, and a base 234. The first end 230 and the second end 232 interact with one or more components of the differential gear train 114. For example, the first end 230 and the second end 232 can be coupled to a portion of the differential gear train 114 via a gear, a belt, a pulley, or any other suitable system. As such, input to the differential gear train 114 can drive rotation of the outer housing 105. The base 234 of the yoke 104 is coupled to the outer housing 105 via a portion of the first gear train 106. In the illustration of FIG. 2B, the yoke 104 is a single component including the first end 230, the second end 232, and the base 234. In other embodiments, the portions of the yoke 104 are separate elements mechanically coupled together (e.g., welded, by an adhesive, etc.).

The first gear train 106 described above includes a pinion gear 236 and a bevel gear 238 engaged with the pinion gear 236. The pinion gear 236 is coupled to the first end 230 of the yoke 104. The bevel gear 238 is rotatably coupled to the base 234 of the yoke 104. Each gear 236, 238 rotates relative to the yoke 104 about its respective rotational axis. As such, the base 234 may be stationary relative to the vertical axis 122. The pinion gear 236 rotates about an axis approximately parallel to a horizontal axis 224. The rotational axis of the bevel gear 238 is collinear with the vertical axis 122 and a second branch of the knuckle component (not shown in FIG. 2A). The rotational axis of the bevel gear 238 remains collinear with the first branch as yoke 104 rotates about the horizontal axis 224. While FIG. 2A illustrates a pinion gear 236 and a bevel gear 238, the size, type, and/or configuration of gears may vary in other embodiments based on the dimensions of the yoke 104 or desired properties of the first gear train 106 (e.g., gear ratio, mechanical advantage, input and/or output torque, or other parameters).

In the embodiment of FIG. 2A, the differential gear train 114 includes a second gear train 242 and a third gear train 244. The second gear train 242 is configured to actuate rotation of the outer housing 105 about the vertical axis 122. The second gear train 242 includes a first miter gear 246a and a second miter gear 246b engaged with the first miter gear 246a. The second miter gear 246b is coupled to the first gear train 106. The second miter gear 246a is coupled to the first gear train 106 via a belt, a gear system, a pulley, or using any other suitable method. For example, the pinion gear 236 may be coupled to the second miter gear 246b via an additional gear train. The first miter gear 246a can be coupled to a first driver (shown in FIG. 3) via a channel 248a. Actuation of the first driver causes rotation of first miter gear 246a, and subsequently rotation of the second miter gear 246b and the first gear train 106. Rotation of the first gear train 106 includes rotation of the bevel gear 238 about its rotational axis, which causes rotation of the outer housing 105 about the vertical axis 122. In alternative embodiments, the second miter gear 246b can be coupled to a driver and/or the first miter gear 246b can be coupled to the first gear train 106.

The third gear train 244 is configured to actuate rotation of the outer housing 105 about the horizontal axis 224. Similar to the second gear train 242, the third gear train 244 comprises a third miter gear 246c and a fourth miter gear 246d engaged with the third miter gear 246c. Although not illustrated in FIGS. 2A-2D, the fourth miter gear 246d is coupled to the second end 232 of the yoke 104 via a belt, a gear system, a pulley, other suitable methods, or some combination thereof. Additionally, the third miter gear 246c can be coupled to a second driver (shown in FIG. 3) via a channel 248b. Actuation of the second driver causes rotation of the third miter gear 246c, which causes rotation of the fourth miter gear 246d. The fourth miter gear 246d causes rotation of the yoke 104 and thus the outer housing 105 about the horizontal axis 224. In alternative embodiments, the fourth miter gear 246d can be coupled to a driver and/or the third miter gear 246c can be coupled to the second end 232 of the yoke 104.

As shown in FIG. 2A and described above, the differential gear train 114 includes four miter gears, but in other examples, the differential gear train 114 can include a different number of gears, different types of gears (e.g., spur gears, miter gears, bevel gears, etc.) and/or different sizes of gears. In some embodiments, the second gear train 242 and/or the third gear train 244 are part of a planetary gear system. Furthermore, the differential gear train 114 could include a belt, a pulley system, or any other system in addition to or instead of the second gear train 242 and the third gear train 244 for actuating rotation of the outer housing 105 about one or more axes.

One or more sensors can be positioned proximal to the mechanical eyeball 100 to measure rotation of the horizontal encoder bar 116 and the vertical encoder bar 118. Shown in FIG. 2A, a first sensor 262 and the second sensor 264 are positioned approximately tangential and central to the horizontal encoder bar 116 and the vertical encoder bar 118. The first sensor 262 may be configured to read the horizontal encoder bar 116 and the second sensor 264 may be configured to read the vertical encoder bar 118. In some embodiments, the first sensor 262 is positioned proximal to the second sensor 264. In other embodiments, only one sensor is configured to read both encoder bars. The sensors are fixed proximal to the mechanical eyeball 100 so they do not require space to move within the mechanical eyeball 100. In other embodiments, the sensors may be positioned along an internal surface of the outer housing 105, at the center of the mechanical eyeball 100, coupled to the knuckle component 108, fixed to the gear carriage 102, or at any other location suitable for sensing horizontal encoder bar 116 and the vertical encoder bar 118. In the embodiment of FIG. 2A, the one or more sensors may be located at a fixed position external to the mechanical eyeball 100 to minimize the size of the mechanical eyeball 100, but in other embodiments, the sensors may be rotatable about one or more axes.

FIG. 2B is a second side view of the mechanical eyeball 100 of FIG. 1A, in accordance with one or more embodiments. FIG. 2B illustrates the components of the mechanical assembly 101 from an opposing side of FIG. 1B (i.e. rotated 180 degrees about the vertical axis 122). As illustrated by the FIG. 2B, the mechanical eyeball illustrated in FIGS. 2A-2D is approximately symmetric along the optical axis 107.

Shown in FIG. 2B, the mechanical eyeball 100 may be coupled to a mounting component 268. The mounting component 268 may be part of another system (e.g., an animatronic device, navigation system, pointing device, etc.). For example, the mounting component 268 may be a fixed receptacle (e.g., eye socket) in an animatronic device. Alternatively, the mounting component 268 may be a standalone component configured to support the mechanical eyeball 100 (e.g., for use in a navigation system). The mounting component 268 may encase a portion or all of the mechanical eyeball 100. In some embodiments, the mounting component 268 may be configured to have a shape similar to the surface of the outer housing 105. The mechanical eyeball 100 may be removably coupled to the mounting mechanism 268 such that it can be easily repaired or replaced. In one embodiment, the first sensor 262 and the second sensor 264 are coupled to the mounting component 268 by one or more attachment mechanisms 266. The first sensor 262 and the second sensor 264 can be positioned to read the encoder bars 116 and 118, as described above in relation to FIG. 2A.

FIG. 2C is a first perspective view 200c of the mechanical eyeball 100, in accordance with one or more embodiments. Illustrated in FIG. 2C, the yoke 104 is rotatably coupled to the gear carriage 102 via joints 209a and 209b. In one embodiment, the yoke 104 includes an aperture at each of the first end 230 and the second end 232. A portion of the gear carriage 102 passes through each aperture forming joint 209a and 209b. Thus, the first and second ends 230, 232 are rotatably coupled to a portion of the gear carriage 102 and the yoke 104 is able to pivot about the horizontal axis 224. In some embodiments, the joints 209a and 209b operate as a hinge, where the gear carriage 102 is stationary and the yoke 104 rotates about the horizontal axis 224. Alternatively, the joints 209a and 209b may be one or more different coupling mechanisms (e.g., ball and socket, ball bearing, saddle joint, etc.).

The embodiment of FIG. 2C also shows a body 240 and a second branch 212 of the knuckle component 108. The body 240 is approximately spherical on one side. The body 240 is connected to the first gear train 106 by the second branch 212. The second branch 212 is collinear with the vertical axis 122. As the yoke 104 rotates about the horizontal axis 224, the second branch 212 rotates about the horizontal axis 224. Additionally, as the first gear train 106 rotates about the vertical axis 122, the second branch 212 and the body 240 also rotate about the vertical axis 122.

The body 240 includes a slot 260 that allows rotation of the horizontal encoder bar 116 to be decoupled from rotation of the yoke 104. The horizontal encoder bar 116 is configured to move along the length of the slot and not move along the width of the slot. The horizontal encoder bar 116 is coupled to the outer housing 105 via the slot 260 such that rotation of the outer housing 105 about the vertical axis 122 causes simultaneous rotation of the horizontal encoder bar 116 while rotation of the yoke 104 about the horizontal axis 224 does not affect the horizontal encoder bar 116. The orientation of the slot 260 enables the horizontal encoder bar 116 to move independent of the yoke 104 and thus the knuckle component 108 is decoupled from the horizontal encoder bar 116 along one rotational axis. The vertical encoder bar 118 is coupled to the yoke 104 such that rotation of the yoke 104 about the horizontal axis 224 causes simultaneous rotation of the vertical encoder bar 118. In this configuration, the horizontal encoder bar 116 rotates only about the vertical axis 122, and the vertical encoder bar 118 rotates only about the horizontal axis.

FIG. 2D is a second perspective view 200d of the mechanical eyeball 100, in accordance with one or more embodiments. FIG. 2D illustrates additional components that allow the horizontal encoder bar 116 to rotate about the vertical axis 122 without interfering with components of the mechanical assembly. The horizontal encoder bar 116 is coupled to the gear carriage 102 via a rod 266 and a bearing 262. The bearing 262 is aligned with the vertical axis 122 such that a portion of the horizontal encoder bar 116 is coupled to the gear carriage 102 approximately along the vertical axis 122. The rod 266 is coupled to the bearing 262 and the horizontal encoder bar 116. The rod 266 rotates about the vertical axis 122 within a clearance cavity 264 of the gear carriage 102, allowing the horizontal encoder bar 116 to effectively rotate about the vertical axis 122.

FIG. 3 is a perspective view of the mechanical eyeball of FIG. 1A coupled to a set of drivers, in accordance with one or more embodiments. As shown in FIG. 3, the first miter gear 246a can be coupled to a first driver 350a and the third miter gear 246c can be coupled to a second driver 350b. Furthermore, the first driver 350a and the second driver 350b can be coupled to a first motor and a second motor. In other embodiments, the drivers 350a and 350b may be coupled to a single motor. The drivers 350a and 350b are capable of being actuated at different velocities. In one embodiment, the drivers 350a and 350b are cylindrical rods configured to mate with channels (e.g., 248a, 248b) of the miter gears 246a and 246c. The drivers 350a and 350b may be composed of a strong and robust material such as steel, aluminum, copper, or any suitable material for actuating rotation of the mechanical eyeball 100. In other embodiments, the drivers 350a and 350b can be any shape suitable for interacting with the mechanical eyeball 100. Additionally, the drivers 350a and 350b are positioned so that they do not interfere with other components of the mechanical eyeball 100 (i.e., they do not affect rotation of the encoder bars). The drivers 350a and 350b are at least partially external to the mechanical eyeball 100 and are removable from their respective positions. Responsive to actuation of the first driver 350a, the first miter gear 246a causes rotation of the outer housing 105 about the vertical axis 122. Responsive to actuation of the second driver 350b, the third miter gear 246c causes rotation of the outer housing 105 about the horizontal axis 224. Rotation of the outer housing 105 causes rotation of the encoder bars 116 and 118 about at least one of the vertical axis 122 and the horizontal axis 224.

The mechanical assembly described above is a compact design of a two-dimensional rotational system that can be implemented in a mechanical eyeball 100 without sacrificing precision and accuracy of rotation of the optical axis. In other embodiments, the mechanical assembly may be coupled with additional components to allow the outer housing to rotate about a third rotational axis, perpendicular to the first rotational axis and the second rotational axis at the center point. Furthermore, the mechanical assembly has a high degree of modularity, allowing components of the mechanical eyeball 100 to be included in a navigation system, a satellite system, an image acquisition system, an optical system, an eye tracking verification system, a robotic system, an optical and display system, a pointing mechanism, or any other two-dimensional rotational device. In one embodiment, the mechanical eyeball 100 described above can be included in an animatronic device. An example of an animatronic device with one or more mechanical eyeballs 100 is described in greater detail below.

Example Animatronic System Environment

The mechanical eyeball 100 can function as a high performing and realistic eyeball in an animatronic device. The design is compact and discrete, allowing the mechanical eyeball 100 to fit within an animatronic device along with other components (e.g., a motor, a controller, other hardware, etc.), and appear authentic to an observer. Additionally, an animatronic device including a mechanical eyeball 100 can be trained using machine learning and iterative processes, so that it is highly accurate and precise. In some examples, an eye tracking system may be used track eye movements of a user, and the tracked eye movements may be mapped to a mechanical eyeball 100 in an animatronic device. Sensors positioned near the mechanical eyeball 100 and encoder bars in the mechanical eyeball 100 can help validate the eye tracking system to ensure that it accurately tracks and measures eye movements.

Figure 4:
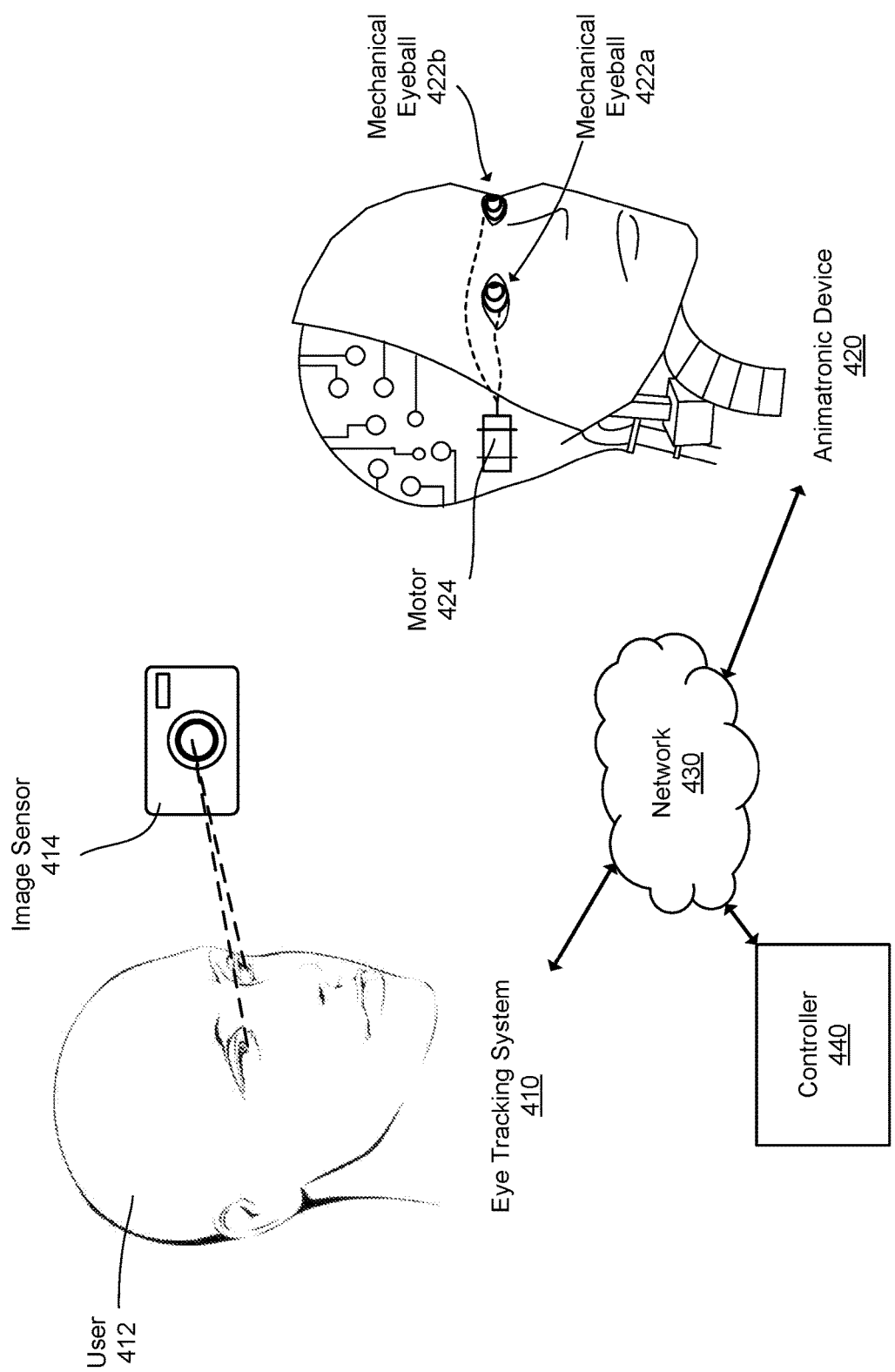
FIG. 4 is a schematic of an eye tracking system and an animatronic device, in accordance with one or more embodiments.

FIG. 4 is a schematic of an eye tracking system 410 and an animatronic device 420, in accordance with one or more embodiments. The eye tracking system 410 and the animatronic device 420 are connected by a network 430. In general, eye tracking systems measure position and movement of a human eye. The eye tracking system 410 shown in FIG. 4 is configured to track movement of at least one eye of a user 412 using at least an image sensor 414 (e.g., a camera). In some other embodiments, the eye tracking system 410 may also use some form of active illumination (e.g., structured light). In the embodiment shown, the user 412 faces the image sensor 414, and the image sensor 414 captures movement of a left and right eye of the user 412. The eye tracking system 410 may track a line of sight (e.g., a foveal axis) of each eye of the user 412 such that the eye tracking system 410 can determine a direction where the user 412 is looking at a given time. The eye tracking system 410 may include additional sensors such as light sensors (e.g., photodetectors, infrared sensors), motion sensors, optical sensors, or any other sensor for assisting in eye tracking. The eye tracking system 410 in FIG. 4 is shown for illustrative purposes, but there are many other types of eye tracking systems that may be used with the animatronic device 420. For example, other eye tracking systems may include display screens, eye glasses, a VR headset, sensors (e.g., image sensors, optical sensors, light sensors), and/or lights.

FIG. 4 also illustrates the animatronic device 420. In general, animatronic devices are configured to animate a replica of a human or an animal. Animatronic devices often use cables, gears, pulleys, or other mechanical systems to imitate movements of humans and animals. In the embodiment of FIG. 4, the animatronic device 420 includes two mechanical eyeballs 422a and 422b, each with a mechanical assembly configured to replicate the motion of an eye of a human. Furthermore, the mechanical eyeballs 422a and 422b can be designed to appear realistic to an observer (e.g., by including a pupil, a colored iris, etc.). In one embodiment, each mechanical eyeball 422a and 422b of the animatronic device 420 is a mechanical eyeball 100 described above. As shown in FIG. 4, the animatronic device 420 may include additional components to further resemble a human (e.g., a mouth, a nose, etc.), where each additional component has a respective mechanical assembly for controlling movement of the component.

The animatronic device 420 also includes a motor 424 for driving rotation of the mechanical eyeballs 422a and 422b. The motor 424 converts electrical energy into mechanical torque. Both mechanical eyeballs 422a and 422b of the animatronic device 420 are coupled to the motor 424 so that the motor 424 can drive movement of both mechanical eyeballs 422a and 422b. In other embodiments, the animatronic device 420 can include additional motors (e.g., a motor corresponding to each mechanical eyeball 422a and 422b). In FIG. 4, the motor 424 is included in a back region of the animatronic device 420 such that the motor 424 may not be visible to an observer, but in other embodiments the motor 424 may be external to the animatronic device 420.

The eye tracking system 410 and the animatronic device 420 communicate over the network 430. The network 430 can be any suitable network, such as the Internet, a LAN, a MAN, a WAN, a mobile wired or wireless network, a private network, a virtual private network, a direct communication line, and the like. The network 430 can also be a combination of multiple different networks of the same or different types.

An additional component may be configured to translate information from the eye tracking system 410 to the animatronic device 420. In the schematic shown in FIG. 4, a controller 440 maps the tracked eye movement determined by the eye tracking system 410 to the eye movement of the animatronic device 420. The controller 440 can generate instructions based on the tracked eye movement of one or more eyes and provide the instructions to the animatronic device 420. Responsive to the instructions, the animatronic device 420 can actuate the motor 424. In other embodiments, the controller 440 actuates the motor 424. The controller 440 is described in greater detail below in relation to FIG. 5

Figure 5:
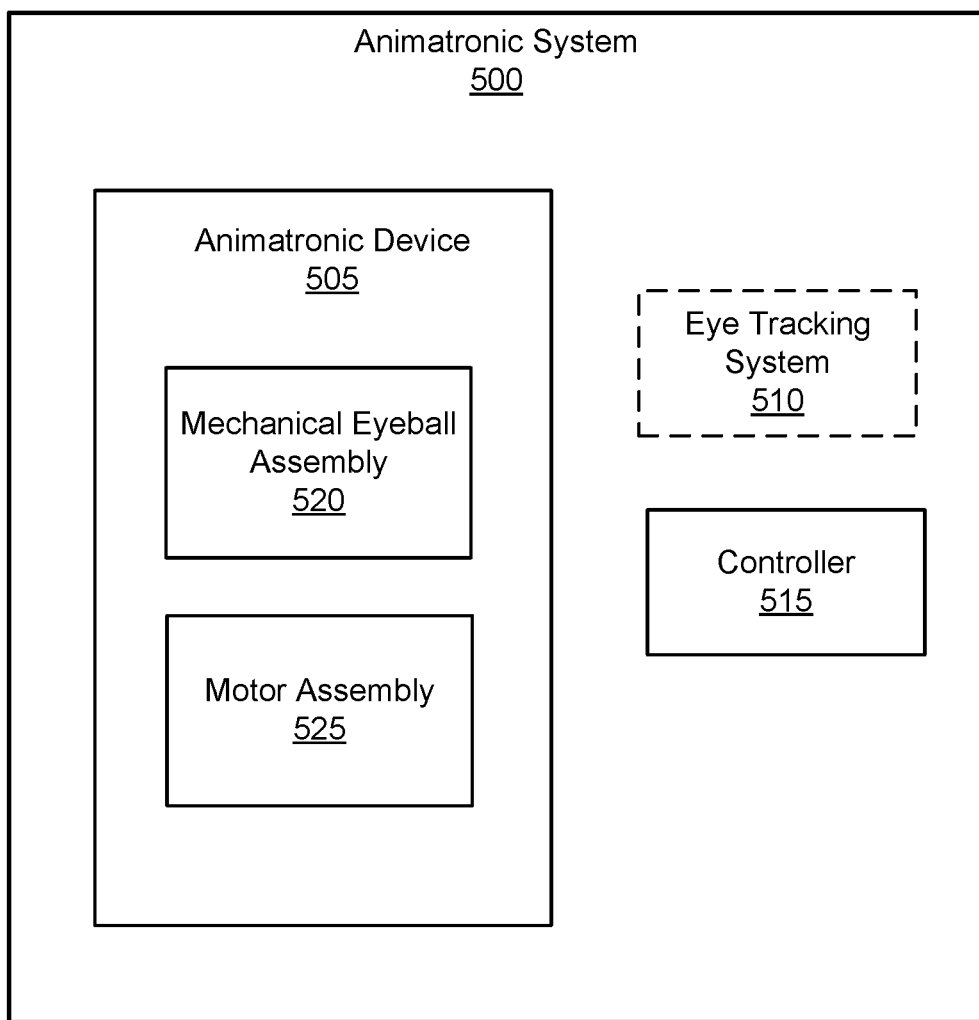
FIG. 5 is an example animatronic system, in accordance with one or more embodiments.

FIG. 5 is an example animatronic system 500, in accordance with one or more embodiments. The animatronic system 500 includes an animatronic device 505, an optional eye tracking system 510, and a controller 515. The animatronic system 500 can include more or less components than described herein.

The animatronic device 505 is a device configured to replicate a human or animal. In one embodiment, the animatronic device 505 is a head that resembles a human head, and the head includes one or more receptacles for retaining one or more mechanical eyeballs (e.g., animatronic device 420). The animatronic device 505 is configured to actuate one or more mechanical eyeballs to move in a manner that mimics human eye movement in accordance with instructions from the controller 515. The head of the animatronic device 505 may include additional components that may interact with the mechanical eyeballs. For example, the animatronic device 505 may retain hardware for actuating the mechanical eyeballs. The hardware may be retained in a position within the animatronic device 505 that is not visible to an observer. In some embodiments, the animatronic device 505 includes a skin over mold resembling human skin and concealing one or more hardware components. Furthermore, the animatronic device 505 can include additional components that mimic other human movements (e.g., a mouth that opens and closes, eyebrows that move, etc.). In other embodiments, the animatronic device 505 includes a body coupled to the head. The animatronic device includes a mechanical eyeball assembly 520 and a motor assembly 525. The animatronic device 505 may be connected (e.g., electronically, wirelessly, etc.) to the eye tracking system 510 and/or the controller 515.

The mechanical eyeball assembly 520 includes one or more mechanical eyeballs configured to rotate in a manner that mimics rotation of a human eye. Described herein, the mechanical eyeball assembly 520 includes one or more mechanical eyeballs 100, described above in relation to FIGS. 1-3. And in some embodiments, one or more of the mechanical eyeballs that are part of the mechanical eyeball assembly may also include one or more optional devices (e.g., the optional device 170), one or more optical cameras, one or more motion sensors, one or more light sources, some other component for assisting in eye tracking validation, or some combination. In one example, the mechanical eyeball assembly 520 includes a first mechanical eyeball corresponding to a left eye of a user and a second mechanical eyeball corresponding to a right eye of a user. In other embodiments, the animatronic device 505 includes a different number of mechanical eyeballs. Each mechanical eyeball in the mechanical eyeball assembly 520 may be coupled to one or more drivers, and the animatronic device 505 can actuate the one or more drivers to cause rotation of the mechanical eyeballs in the mechanical eyeball assembly 520.

The motor assembly 525 is configured to actuate one or more mechanical eyeballs of the mechanical eyeball assembly 520. The motor assembly 525 may be mechanically coupled to the mechanical eyeball assembly 520 and electronically coupled to the animatronic device 505. The motor assembly 525 can include one or more motors. For example, the motor assembly 525 can include four motors, each motor coupled to either a first driver or a second driver of a first mechanical eyeball or a second mechanical eyeball in the mechanical eyeball assembly 520. In another example, the motor assembly 525 can include two motors, each motor corresponding to a mechanical eyeball in the mechanical eyeball assembly 520. In alternative embodiments, the motor assembly 525 may be a different type of actuating system such as a pneumatic actuating system, a hydraulic actuating system, or any other suitable actuating system. For example, in one embodiment, the motor assembly 525 may be a magnetic actuator configured to actuate a horizontal encoder bar and/or a vertical encoder bar of one or more mechanical eyeballs.

The eye tracking system 510 tracks eye movement of one or more eyes (e.g., eyes of a user, eyes of an animal, mechanical eyeballs, etc.). In some embodiments, the eye tracking system 510 is part of the animatronic system 500. For example, the eye tracking system 510 may be used to capture eye motion which is used to direct in real time an orientation of one or more mechanical eyeballs of the mechanical eyeball assembly 505. In other embodiments, the eye tracking system 510 is not part of the animatronic system 500—and is instead part of an artificial reality headset. For example, the animatronic system 500 calibrates and/or measures performance of an eye tracking system 510 that is part of an artificial reality headset. In this embodiment, the animatronic system 500 is functioning more like a calibration and/or validation system for the eye tracking system 510. The eye tracking system 510 may be any type of eye tracking system. The eye tracking system 510 may include, e.g., one or more cameras, an illuminator, a depth camera (e.g., using structured light, time-of-flight, stereo, etc.), or some combination thereof. The eye tracking system 510 tracks position (inclusive of orientation) of a left eye and/or a right eye, and the eyes may be eyes of a user (e.g., the user 412) and/or mechanical eyeballs of the mechanical eyeball assembly 520. The eye tracking system 510 can provide information related to tracked eye movement to the controller 515. The eye tracking system 510 can provide the tracked eye movement to the controller 515 in real time (i.e., as the eye tracking system 510 tracks eye movement of a user) or after completion of eye tracking. Shown in FIG. 5, the eye tracking system 510 may be part of the animatronic system 500.

The controller 515 is configured to generate eye movement instructions that cause the animatronic device 505 to actuate the mechanical eyeball assembly 520. The eye movement instructions may also include instructions controlling one or more optional devices (e.g., the optional device 170) within the mechanical eyeballs. In one embodiment, the controller 515 generates a set of eye movement instructions based on the eye tracking system 510. In other embodiments, the controller 515 can generate eye movement instructions based on input provided by a user, information from another system, or according to any suitable parameters. In one embodiment, the controller 515 may be configured to map the tracked eye movement of one or more eyes of a user measured by the eye tracking system 510 to movement of the mechanical assembly 520. The controller 515 can generate instructions based on the mapping of the tracked eye movement. For example, the controller 515 maps the tracked eye movement of a left eye and a right eye of a user to a first mechanical eyeball and a second mechanical eyeball in the mechanical eyeball assembly 520. Based on the mapping, the controller 515 can generate synched eye movement instructions for the animatronic device 505 to cause rotation of both the first mechanical eyeball and the second mechanical eyeball.

In another embodiment, the controller 515 is configured to generate eye movement instructions based on a stored test movement pattern. The test movement pattern is a series of movements that can be performed by one or more mechanical eyeballs as part of a calibration and/or validation process of an eye tracking system. For example, in a calibration and/or validation process of an eye tracking system 510 that is part of or intended to be part of an artificial reality headset, the controller 515 may provide instructions including a test movement pattern to the animatronic device 505. The controller 515 may also provide instructions to the artificial reality headset that causes the artificial reality headset to display a particular pattern (e.g., a series of points arranged in a grid). The eye tracking system 510 can track movement of the mechanical eyeball assembly 520 using a device (e.g., a VR headset), and provide the tracked eye movement to the controller 515. And in some embodiments, optical cameras (e.g., the optional device 170) within one or more of the mechanical eyeballs capture images of what the mechanical eyeballs are seeing (e.g., images centered on a gaze orientation). The controller 515 can compare the information from the cameras with the tracked movement of the one or more mechanical eyeballs to determine values for one or more metrics describing performance of the eye tracking system 510, and provide a report to a user of the animatronic system 500 describing performance of the eye tracking system 510. Metrics can include, e.g., accuracy, latency, precision, gaze filter performance and optimization, or some combination thereof.

The controller 515 provides the generated instructions to the animatronic device 505 such that the animatronic device 505 actuates the mechanical eyeball assembly 520. In one embodiment, controller 515 may provide instructions after completion of eye tracking (e.g., after the mechanical eyeball assembly 520 has completed the test movement pattern). Alternatively, the controller 515 may continuously or periodically update the eye movement instructions such that the animatronic device 505 actuates the mechanical eyeball assembly 520 in real time or near real time (e.g., at the same time as movement of a user's eyes). The instructions generated by the controller 515 may cause the animatronic device 505 to actuate the mechanical eyeballs in the mechanical eyeball assembly 520 simultaneously. In other embodiments, the instructions may cause the animatronic device 505 to actuate the mechanical eyeballs independently (e.g., the animatronic device 505 actuates a first mechanical eyeball and subsequently actuates a second mechanical eyeball). In general, the instructions may cause the animatronic device 505 to actuate the mechanical eyeball assembly 520 in a manner that allows rotation of the mechanical eyeballs to appear realistic and fluid to an observer.

In some example systems, it can be difficult to precisely direct the optical axis of a mechanical eyeball such that movement of the mechanical eyeball appears fluid to an observer. In some embodiments to improve consistency and fluidity of the apparent movement of the mechanical eyeball assembly 520, the controller 515 can determine one or more predicted encoder values of each mechanical eyeball in the assembly. The one or more predicted encoder values correspond to an amount of rotation of a horizontal encoder bar and a vertical encoder bar about a center point about one or more of the first rotational axis and the second rotational axis of a mechanical eyeball. The animatronic device 505 can include one or more sensors to measure the actual rotation of the horizontal encoder bar and/or the vertical encoder bar (referred to herein as "one or more rotated encoder values"). The controller 515 can analyze the rotation of the mechanical eyeball assembly 520 based on the predicted and rotated encoder values.

In one embodiment, the controller 515 compares the one or more predicted encoder values and the one or more rotated encoder values of a mechanical eyeball. The controller 515 can determine a difference between the predicted encoder values and the rotated encoder values. In some embodiments, the controller 515 compares the difference to a threshold, and if the difference exceeds the threshold, the controller 515 can provide updated instructions to the animatronic device 505, causing the animatronic device 505 to adjust actuation of the mechanical eyeball assembly 520. In other embodiments, if the difference exceeds the threshold, the controller 515 may alert the animatronic system 500 to indicate a malfunction (e.g., due to faulty eye tracking system 510, broken mechanical eyeball 522a, etc.). If the difference does not exceed the threshold, the controller 515 may ignore the difference. The controller 515 can calibrate and/or analyze performance of the animatronic device 505 based on the rotated encoder values measured by the one or more sensors and the one or more predicted encoder values determined based on the eye tracking system 510, described in greater detail below. Additionally, the controller 515 can use the encoder values to validate the capabilities and/or accuracy of the eye tracking system 510.

In some embodiments, the controller 515 can train the animatronic device 505 using a machine learning model based on the one or more predicted encoder values and the one or more rotated encoder values. The example above is described in relation to a single mechanical eyeball, but the controller 515 can concurrently evaluate the encoder values of a first mechanical eyeball and a second mechanical eyeball in the mechanical assembly 520 based on a set of synched instructions, and the controller 515 can train the animatronic device 505 based on the evaluation of the synched mechanical eyeballs. The evaluation of the rotation of each mechanical eyeball and training of the animatronic device 505 can allow for accurate and precise movement of the mechanical assembly 520.

In one embodiment, the controller 515 is configured to read and execute instructions from a machine-readable medium. The controller 515 can be used to execute instructions (e.g., program code or software) for causing the animatronic device 505 to perform any one or more of the methodologies (or processes) described herein. In some embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute instructions to perform any one or more of the methodologies discussed herein.

An example controller 515 can include one or more processing units (generally processor). The processor is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The controller 515 also includes a main memory. The computer system may include a storage unit. The processor, memory, and the storage unit communicate via a bus.

In addition, the controller 515 can include a static memory, a graphics display (e.g., to drive a plasma display panel (PDP), a liquid crystal display (LCD), or a projector). The controller 515 may also include alphanumeric input device (e.g., a keyboard), a cursor control device (e.g., a mouse, a trackball, a joystick, a motion sensor, or other pointing instrument), a signal generation device (e.g., a speaker), and a network interface device, which also are configured to communicate via the bus.

The storage unit includes a machine-readable medium on which is stored instructions (e.g., software) embodying any one or more of the methodologies or functions described herein. The instructions may also reside, completely or at least partially, within the main memory or within the processor (e.g., within a processor's cache memory) during execution thereof by the computer system, the main memory and the processor also constituting machine-readable media. The instructions may be transmitted or received over a network via the network interface device.

Figure 6:
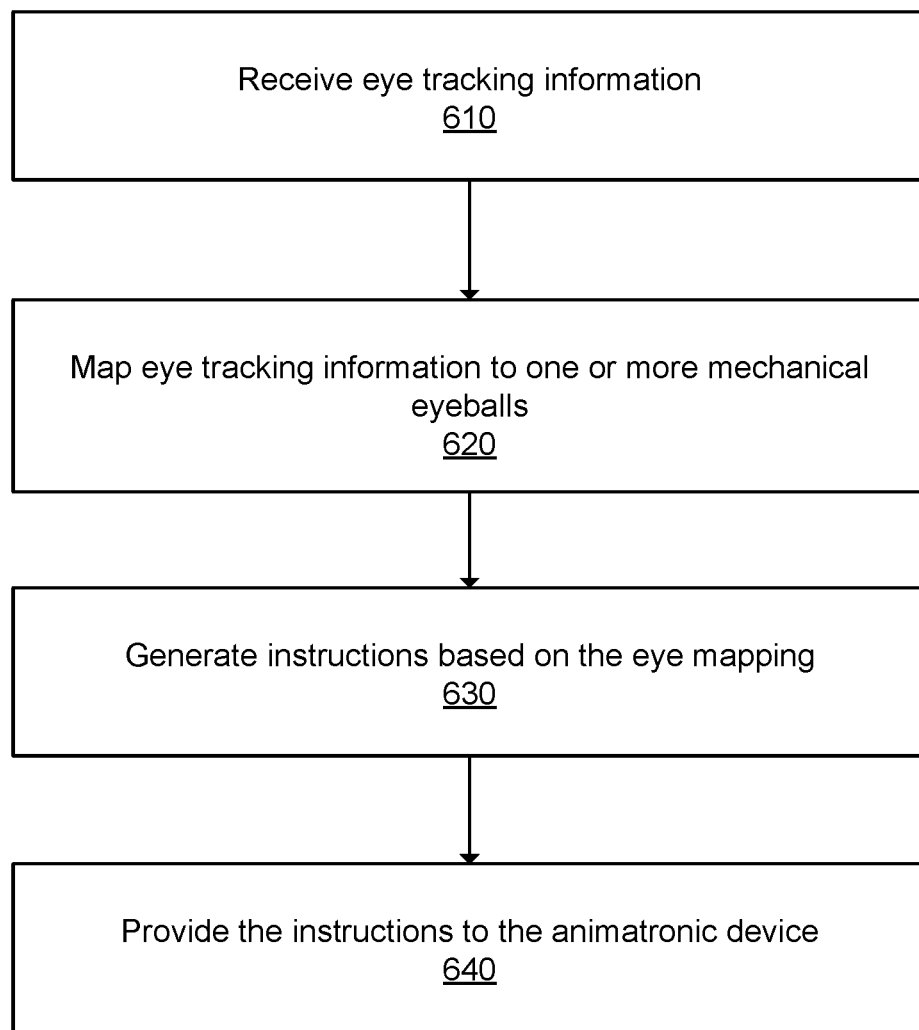
FIG. 6 is a flowchart illustrating a method of controlling an animatronic device, in accordance with one or more embodiments.

FIG. 6 is a flowchart illustrating a method of providing instructions to an animatronic device, in accordance with one or more embodiments. The process 600 of FIG. 6 may be performed by the components (e.g., a controller) of an animatronic system, e.g., the animatronic system 500 of FIG. 5. Other entities may perform some or all of the steps of the process in other embodiments. Likewise, embodiments may include different and/or additional steps, or perform the steps in different orders.

The controller receives 610 eye tracking information. In some embodiments, the controller receives the information from an eye tracking system configured to track movement of one or more eyes (e.g., of a human, an animal, a robot, etc.). The eye tracking information can include information describing one or more directions in which the eyes of a user are directed over a period of time. The eye tracking information may be provided in real time or near real time (e.g., as a user's eyes are moving).

The controller maps 620 the eye tracking information to movement of one or more mechanical eyeballs. In one embodiment, the controller analyzes the information related to movement of a left eye and a right eye of a user, and maps the movement to a first mechanical eyeball and a second mechanical eyeball. The controller can map the movement such that the first mechanical eyeball and the second mechanical eyeball are synched. Alternatively, the controller may map movement of a single eye of user to movement of a first and/or second mechanical eyeball.

The controller generates 630 instructions based on the eye mapping. The instructions may cause the one or more mechanical eyeballs to rotate in a manner that mimics movement of the user's eyes. The instructions can include instructions for actuating one or more drivers of a mechanical eyeball. In other embodiments, the instructions can include directions for actuating a horizontal encoder and/or a vertical encoder. The instructions may also include one or more predicted encoder values, as described above in relation to FIG. 5. In one embodiment, the instructions cause one or more mechanical eyeballs to rotate simultaneously. Alternatively, the instructions may cause the one or more mechanical eyeballs to rotate independently.

The controller provides 640 the instructions to the animatronic device. The controller may provide the instructions via a network or via a wired connection. The instructions cause the animatronic device to rotate one or more mechanical eyeballs so that the rotation appears fluid and realistic to a user. In some embodiments, the instructions cause the animatronic device to actuate the motor assembly, described above in relation to FIG. 5. The instructions may cause the animatronic device to actuate a single motor or a plurality of motors. In one example, rotation of the one or more mechanical eyeballs may be used to validate an eye tracking system. In other examples, the animatronic device is used to simulate a human.

FIG. 7 is a flowchart illustrating a method of calibrating an animatronic device, in accordance with one or more embodiments. The process 700 of FIG. 7 may be performed by the components (e.g., a controller) of an animatronic system, e.g., the animatronic system 500 of FIG. 5. Other entities may perform some or all of the steps of the process in other embodiments. Likewise, embodiments may include different and/or additional steps, or perform the steps in different orders.

The controller provides 710 a set of instructions including a test movement pattern to the animatronic device. The test movement pattern can include a set of eye movements for one or more mechanical eyeballs included in and/or coupled to the animatronic device. Responsive to the set of instructions, the animatronic device can actuate one or more of the mechanical eyeballs to execute the test movement pattern and/or control one or more optional devices (e.g., optical cameras) within the mechanical eyeballs. The controller may also provide instructions to an artificial reality headset that includes an eye tracking system under test that causes the artificial reality headset to display a particular pattern (e.g., a series of points arranged in a grid). In some embodiments, the animatronic device actuates the one or more mechanical eyeballs to perform the test movement pattern once, while in other embodiments the one or more mechanical eyeballs may repeatedly execute the test movement pattern (e.g., until the animatronic device is calibrated).

The controller receives 720 tracked eye movement of the one or more mechanical eyeballs executing the test movement pattern from an eye tracking system under test. The eye tracking system under test may be part of an artificial reality headset. The artificial reality headset is communicatively coupled to the controller. In some embodiments, the controller also receives information from one or more optional devices (e.g., optical cameras) in one or more of the one or more mechanical eyeballs. In some embodiments, the controller may receive information from one or more sensors included in the animatronic device information describing the position of each mechanical eye (e.g., the one or more sensors configured to measure a position of the horizontal encoder bar and/or the vertical encoder bar).

The controller determines 730 values for one or more metrics describing performance of the eye tracking system under test based in part on the tracked eye movement. The controller can compare information from the cameras with the tracked movement of the one or more mechanical eyeballs to determine values for the one or more metrics (e.g., accuracy) describing performance of the eye tracking system under test. The controller can generate and provide a report to a user that describes the performance of the eye tracking system 510. The report may include values associated with the one or more metrics.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
   a controller configured to generate eye movement instructions; and
   an animatronic device comprising a mechanical eyeball configured to rotate about a center point in accordance with eye movement instructions, the mechanical eyeball having a first rotational axis and a second rotational axis that both intersect at the center point, the animatronic device configured to:
      actuate a first driver and a second driver based on the instructions, the first driver configured to cause the mechanical eyeball to rotate about the second rotational axis and the second driver configured to cause the mechanical eyeball to rotate about the first rotational axis, and
      measure, using one or more sensors, one or more rotated encoder values that each correspond to an amount of rotation of a first encoder bar and a second encoder bar about the first rotational axis and the second rotational axis.

2. The system of claim 1, wherein the controller is further configured to:
   receive, from an eye tracking system, tracked eye movement of an eye of a user;
   map the tracked eye movement to movement of the mechanical eyeball; and
   generate the instructions based on the mapping.

3. The system of claim 1, wherein the animatronic device further comprises an additional mechanical eyeball and the controller is further configured to:
   receive, from an eye tracking system, tracked eye movement of a first eye and a second eye of a user;
   map the tracked eye movement of the first eye of the user to movement of the mechanical eyeball and the tracked eye movement of the second eye of the user to movement of the additional mechanical eyeball; and
   generate synched instructions for the mechanical eyeball and the additional mechanical eyeball based on the mapping of the first eye movement and the second eye movement.

4. The system of claim 1, wherein the controller is further configured to:
   provide, to the animatronic device, a set of instructions including a test movement pattern;

receive, from an eye tracking system, tracked eye movement of the mechanical eyeball executing the test movement pattern; and determine values for one or more metrics describing performance of eye tracking system based in part on the tracked eye movement.

5. The system of claim 1, wherein the controller is further configured to:

determine one or more predicted encoder values that each correspond to an amount of rotation of the mechanical eyeball about the center point about one or more of the first rotational axis and the second rotational axis; and compare the one or more predicted encoder values to the one or more rotated encoder values.

6. The system of claim 5, wherein responsive to a difference between the one or more predicted encoder values and the one or more rotated encoder values exceeding a threshold, the controller is further configured to:

generate updated instructions that cause the animatronic device to rotate the mechanical eyeball about one or more of the first rotational axis and the second rotational axis; and provide the updated instructions to the animatronic device.

7. An animatronic device comprising:

a first mechanical eyeball configured to rotate about a center point, wherein a first rotational axis of the first mechanical eyeball and a second rotational axis of the first mechanical eyeball intersect at the center point, and the first mechanical eyeball comprises:

a first encoder bar configured to rotate about the second rotational axis, the first encoder bar including a first encoding strip, and a second encoder bar configured to rotate about the first rotational axis, the second encoder bar including a second encoding strip, wherein the animatronic device is configured to actuate rotation of the first mechanical eyeball about one or more of the first rotational axis and the second rotational axis based on instructions provided by a controller.

8. The system of claim 7, wherein actuating rotation of the first mechanical eyeball comprises:

actuating one or more of a first driver and a second driver, the first driver configured to cause the first mechanical eyeball to rotate about the second rotational axis and the second driver configured to cause the first mechanical eyeball to rotate about the first rotational axis.

9. The system of claim 8, wherein the first driver and the second driver are actuated at different velocities.

10. The system of claim 7, wherein the animatronic device is further configured to:

receive, from the controller, a test movement pattern; and actuate the first mechanical eyeball based on a test movement pattern, wherein an eye tracking system is configured to monitor movement of the first mechanical eyeball.

11. The system of claim 7, wherein the animatronic device further comprises:

one or more sensors configured to measure an amount of rotation of the first encoder bar and the second encoder bar about one or more of the first rotational axis and the second rotational axis.

12. The system of claim 11, wherein the instructions are generated based on one or more predicted encoder values that each correspond to an amount of rotation of the mechanical eyeball about the center point about one or more of the first rotational axis and the second rotational axis.

13. The system of claim 12, wherein the animatronic device is trained using a machine learning model based on the one or more predicted encoder values and one or more rotated encoder values measured by the one or more sensors.

14. The system of claim 7, wherein the instructions are generated based on eye movement of a user tracked by an eye tracking system.

15. The system of claim 7, wherein the first mechanical eyeball comprises an image sensor, and wherein the image sensor coincides with an optical axis of the first mechanical eyeball.

16. The system of claim 7, wherein the animatronic device further comprises a second mechanical eyeball and wherein animatronic device is configured to actuate the first mechanical eyeball and the second mechanical eyeball simultaneously responsive to synched instructions generated by the controller.

17. The system of claim 16, wherein the synched instructions are generated based on rotation of a first eye of a user and a second eye of a user measured by an eye tracking system.

* * * * *

UNITED STATES PATENT AND TRADEMARK OFFICE
CERTIFICATE OF CORRECTION

PATENT NO. : 11,376,733 B2  
APPLICATION NO. : 16/437579  
DATED : July 5, 2022  
INVENTOR(S) : Kirk Erik Burgess It is certified that error appears in the above-identified patent and that said Letters Patent is hereby corrected as shown below:

In the Claims

In Column 21, Claim 8, Line 42, delete "The system" and insert -- The animatronic device --, therefor.

In Column 22, Claim 9, Line 4, delete "The system" and insert -- The animatronic device --, therefor.

In Column 22, Claim 10, Line 6, delete "The system" and insert -- The animatronic device --, therefor.

In Column 22, Claim 11, Line 13, delete "The system" and insert -- The animatronic device --, therefor.

In Column 22, Claim 12, Line 19, delete "The system" and insert -- The animatronic device --, therefor.

In Column 22, Claim 13, Line 24, delete "The system" and insert -- The animatronic device --, therefor.

In Column 22, Claim 14, Line 28, delete "The system" and insert -- The animatronic device --, therefor.

In Column 22, Claim 15, Line 31, delete "The system" and insert -- The animatronic device --, therefor.

In Column 22, Claim 16, Line 35, delete "The system" and insert -- The animatronic device --, therefor.

In Column 22, Claim 17, Line 41, delete "The system" and insert -- The animatronic device --, therefor.

Signed and Sealed this  
Fifteenth Day of November, 2022

Katherine Kelly Vidal  
*Director of the United States Patent and Trademark Office*